March 1, 1932.   F. H. OGLESBEE   1,847,493
CULTIVATOR FENDER ATTACHMENT
Filed Sept. 15, 1930   2 Sheets-Sheet 1
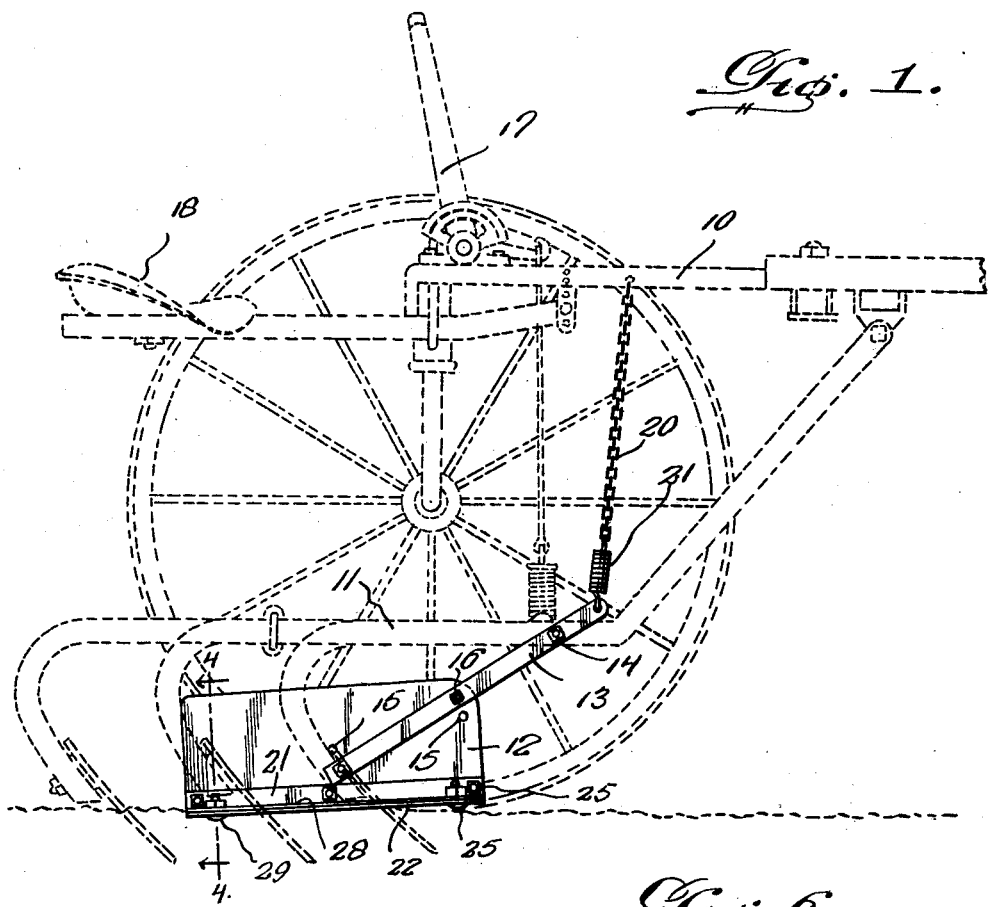
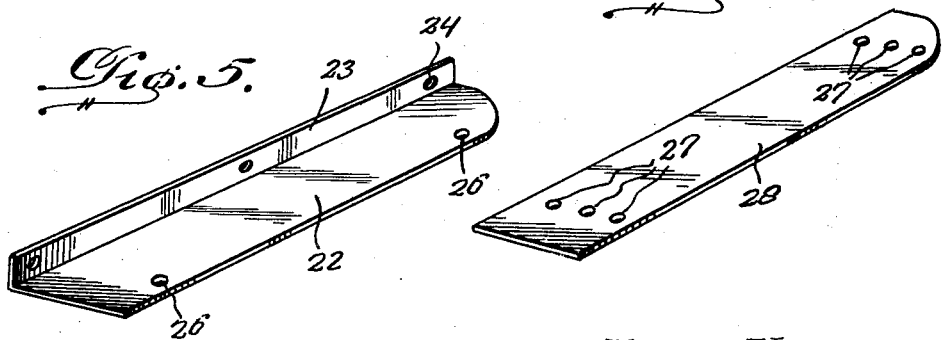
Floyd H. Oglesbee,
INVENTOR.
BY J. Stanley Burch
ATTORNEY.

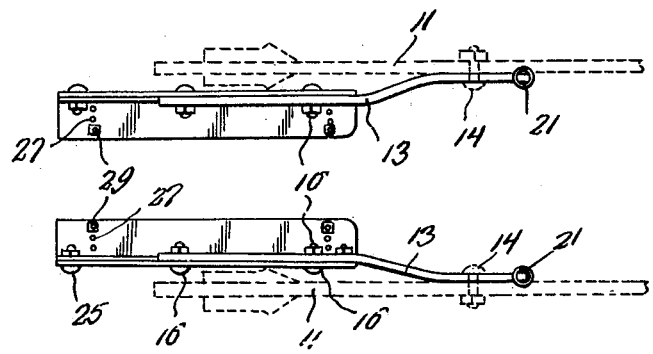
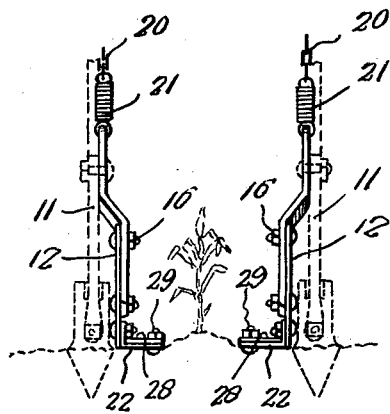
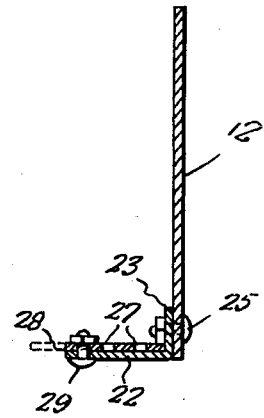

Patented Mar. 1, 1932

1,847,493

UNITED STATES PATENT OFFICE

FLOYD H. OGLESBEE, OF WILMINGTON, OHIO

CULTIVATOR FENDER ATTACHMENT

Application filed September 15, 1930. Serial No. 482,016.

The present invention relates to corn plows, cultivators and the like, and has particular reference to an attachment therefor designed to protect young plants that are being cultivated from injury from lumps of dirt which might otherwise be thrown against the plants, crushing or otherwise injuring the same.

One of the chief characteristics of the present invention resides in the provision of an attachment for the usual cultivator fenders, and which attachment embodies a pair of horizontally disposed guard plates susceptible of adjustment toward and away from each other at opposite sides of the plant row, and arranged to protect the plants from being crushed or otherwise injured by lumps of dirt which tend to move in the direction of the plants, while the latter are being cultivated.

The nature and advantages of the invention will be better understood when the following detail description is read in connection with the accompanying drawings, the invention residing in the combination, construction and arrangement of parts as claimed.

In the drawings forming part of this application like numerals of reference indicate similar parts in the several views and wherein:

Figure 1 is a central longitudinal sectional view through a cultivator illustrating the application of the invention.

Figure 2 is a plan view of a pair of cultivator beams showing how the fenders are mounted, and which fenders form a support for the guard attachment.

Figure 3 is a front elevation of Figure 2.

Figure 4 is a sectional view on line 4—4 of Figure 1.

Figure 5 is a detail view of the stationary plate forming part of one of the guard attachments.

Figure 6 is a view of the adjustable plate used in conjunction with the plate illustrated in Figure 5.

Referring to the drawings in detail 10 indicates generally a cultivator of any ordinary well known construction, the cultivator beams being indicated at 11 and the fenders at 12. The beams 11 are raised or lowered by means of the usual lever 17 from the driver's seat 18.

While these fenders which may be of any well known construction, can be supported on the cultivator in any suitable manner, I preferably employ levers 13 for this purpose. As clearly illustrated in Figures 2 and 3 each lever has a portion offset with relation to its respective beam 11, which portion is bolted or otherwise secured to the adjacent fender 12. Each lever is pivoted as at 14 on its respective beam 11 to allow the fenders to ride over clods of dirt or other obstacles while the cultivator is in use, while each lever can be adjusted with relation to its particular fender to vary the degree of inclination of the latter with respect to the ground. For this purpose each fender is provided with a plurality of spaced openings for each bolt 16, so that these bolts can be selectively arranged in the openings 15 to secure each lever to its particular fender in the desired relation thereto. As illustrated in Figure 1 the fenders are arranged at an inclination to the ground or surface, and are yieldingly held in engagement with the ground by means of coil springs 21 attached to the forward ends of levers 13 and connected to the frame of the cultivator 10 by chains 20.

The plant guard attachment embodies a horizontally disposed plate carried by each fender 12, and these plates project laterally from the inner or confronting faces of the respective fenders 12 to lie at opposite sides of the row of plants being cultivated. As clearly illustrated in Figure 5 each of these plates includes a member 22 provided with a right angular attaching flange 23 having spaced openings 24 to receive bolts or other suitable fastening elements which are employed to attach the plate member 22 to the adjacent fender 12. The plate member 22 is arranged to project inwardly from its particular fender and is provided with spaced openings 26 which are adapted to register with one of a spaced series of openings 27 formed in the adjustable plate member 28. These plate members are of equal length, and the openings 27 extend transversely of the plate member 28, so that the latter can be adjusted with relation to the plate member 22. The plate member 28 is held fixed in its given position with relation to the plate member 22 by suitable fastening bolts 29.

In practice, the adjustable plate members 28 carried by the respective fenders 12 are capable of being adjusted toward each other, so that these plate members 28 can be arranged in close proximity to the row of plants at the opposite sides thereof. Should any lumps of dirt slip beneath the lower edges of the fenders 12 while the machine is in motion, these lumps of dirt will be arrested beneath the guard plates carried by the particular fender, and effectively crushed thereby. Due to the inclination of the fenders and guard plates carried thereby with relation to the ground, and the comparative width of the guard plates, such lumps of dirt that find their way beneath the lower edges of the fenders will be quickly and effectively crushed, and loose dirt will be kept down to prevent any damage or injury being done to the young plants thereby.

As above stated the invention is in the nature of an attachment that can be manufactured and sold at a nominal cost, and more particularly designed to permit of its use on any type of cultivator of the class in question, without the necessity of making any alterations therein.

While it is believed that from the foregoing description the nature and advantages of the invention will be readily apparent, I desire to have it understood that I do not limit myself to what is herein illustrated and described and that such changes may be resorted to when desired as fall within the scope of what is claimed.

What is claimed is:

A plant guard attachment for cultivators comprising in combination with a pair of cultivator fenders, a horizontally disposed guard for each fender, each horizontally disposed guard including a member having a vertically disposed attaching flange secured to the adjacent fender and a horizontal flange provided with openings adjacent its opposite ends, said horizontally disposed guard including a second member slidably adjustable upon the horizontal flange of the first mentioned member and having spaced transverse series of openings adapted to be selectively registered with the openings in said horizontal flange, means adapted to be received by said registering openings for holding the adjustable member fixed with relation to the first named member, and means for supporting said fenders and guard plates and yieldingly maintaining them in engagement with the ground.

In testimony whereof I affix my signature.

FLOYD H. OGLESBEE.